(12) United States Patent
Yao et al.

(10) Patent No.: US 12,545,134 B2
(45) Date of Patent: Feb. 10, 2026

(54) CHARGING SYSTEM AND CHARGING DEVICE THEREOF

(71) Applicant: National Taipei University of Technology, Taipei (TW)

(72) Inventors: Leeh-Ter Yao, Taipei (TW); Chang-Qi Zhang, Taipei (TW); Yi-Cheng Jiang, Taipei (TW); Li-Tung Lee, Taipei (TW); Yu-Ta Huang, Taipei (TW); Kai-Sen Chang, Taipei (TW); I-Hsuan Lin, Taipei (TW); Chien-Yuan Chung, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 630 days.

(21) Appl. No.: 17/987,028

(22) Filed: Nov. 15, 2022

(65) Prior Publication Data
US 2023/0339345 A1 Oct. 26, 2023

Related U.S. Application Data

(60) Provisional application No. 63/333,652, filed on Apr. 22, 2022.

(30) Foreign Application Priority Data

Jul. 8, 2022 (TW) .................................. 111125786

(51) Int. Cl.
*B60L 53/30* (2019.01)
*B60L 53/16* (2019.01)
*B60L 53/62* (2019.01)

(52) U.S. Cl.
CPC ............. *B60L 53/305* (2019.02); *B60L 53/16* (2019.02); *B60L 53/62* (2019.02)

(58) Field of Classification Search
CPC ........ B60L 53/305; B60L 53/16; B60L 53/62; B60L 53/30; Y02T 10/70; Y02T 10/7072; Y02T 90/12
(Continued)

(56) References Cited

U.S. PATENT DOCUMENTS

2016/0193932 A1* 7/2016 Vaghefinazari ....... H02J 7/0029
320/109
2019/0204391 A1* 7/2019 Cottuli ................... G01R 31/38
(Continued)

*Primary Examiner* — Huy Q Phan
(74) *Attorney, Agent, or Firm* — Birch, Stewart, Kolasch & Birch, LLP (57) ABSTRACT

A charging system for charging an electric vehicle includes a charging device and a mobile power supplying equipment. The charging device includes a charging base, a power receiving terminal disposed on the charging base, and a charging gun electrically connected to the power receiving terminal and configured to charge the electric vehicle. The mobile power supplying equipment includes a power module, a docking device, and a power supplying terminal disposed on the docking device and electrically connected to the power module. When the mobile power supplying equipment moves to a position within a predetermined range of the charging base, the docking device is configured to adjust the power supplying terminal to make the power supplying terminal detachably dock with the power receiving terminal, and the power module then outputs power to the charging gun for the charging gun charging the electric vehicle.

20 Claims, 6 Drawing Sheets

(58) Field of Classification Search
USPC .......................................................... 320/109
See application file for complete search history.

(56) References Cited

U.S. PATENT DOCUMENTS

| | | | |
|---|---|---|---|
| 2020/0177026 A1* | 6/2020 | Sosinov | B60L 53/124 |
| 2020/0266658 A1* | 8/2020 | Cottuli | H01M 8/04604 |
| 2022/0048195 A1* | 2/2022 | Rastegar | B25J 9/0084 |
| 2022/0158851 A1* | 5/2022 | Shin | G06Q 50/40 |
| 2023/0173934 A1* | 6/2023 | Lu | B60L 53/11 |
| | | | 320/109 |

* cited by examiner

CHARGING SYSTEM AND CHARGING DEVICE THEREOF

CROSS-REFERENCE TO RELATED APPLICATION

This application claims priority to Taiwanese Invention Patent Application No. 111125786, filed on Jul. 8, 2022, and the benefit of U.S. Provisional Patent Application No. 63/333,652, filed on Apr. 22, 2022, which is incorporated by reference herein in its entirety.

FIELD

The disclosure relates to a charging system, and more particularly to a charging system for charging an electric vehicle.

BACKGROUND

Although electric vehicles (e.g., electric motorcycles, electric cars) are becoming increasingly popular, charging stations for electric vehicles are still not enough. Accordingly, when an owner needs to charge his/her electric vehicle, he/she might have to wait in line for a charging station to become available. In addition, in some countries, installation of a private charging station in a building or community is sometimes prohibited by the homeowner association of the building/community because, for example, the building/community may not have sufficient power supply for the charging station or distribution of electric wires of the charging station may affect appearance of the parking lot where the charging station is to be installed.

SUMMARY

Therefore, an object of the disclosure is to provide a charging system and a charging device thereof that can alleviate at least one of the problems mentioned above.

According to the disclosure, the charging system for charging an electric vehicle includes a charging base and a mobile power supplying equipment.

The charging device includes a charging base that is adapted to be disposed on a support, a power receiving terminal that is disposed on the charging base, and a charging gun that is electrically connected to the power receiving terminal and that is configured to charge the electric vehicle parked at a charging area.

The mobile power supplying equipment includes a power module, a docking device, and a power supplying terminal that is disposed on the docking device and that is electrically connected to the power module.

When the mobile power supplying equipment moves to a position within a predetermined range of the charging base, the docking device is configured to align the power supplying terminal with the power receiving terminal and control the power supplying terminal to move toward the power receiving terminal such that the power supplying terminal is detachably docked with the power receiving terminal, and then the power module outputs power to the charging gun via the power supplying terminal and the power receiving terminal for the charging gun charging the electric vehicle.

According to the disclosure, a charging device is configured to electrically connect an electric vehicle and a mobile power supplying equipment. The charging device includes a charging base, a power receiving terminal, and a charging gun.

The power receiving terminal is disposed on the charging base and is configured to detachably dock with a power supplying terminal of the mobile power supplying equipment to receive power from the mobile power supplying equipment.

The charging gun is electrically connected to the power receiving terminal and is configured to charge the electric vehicle using the power from the mobile power supplying equipment.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
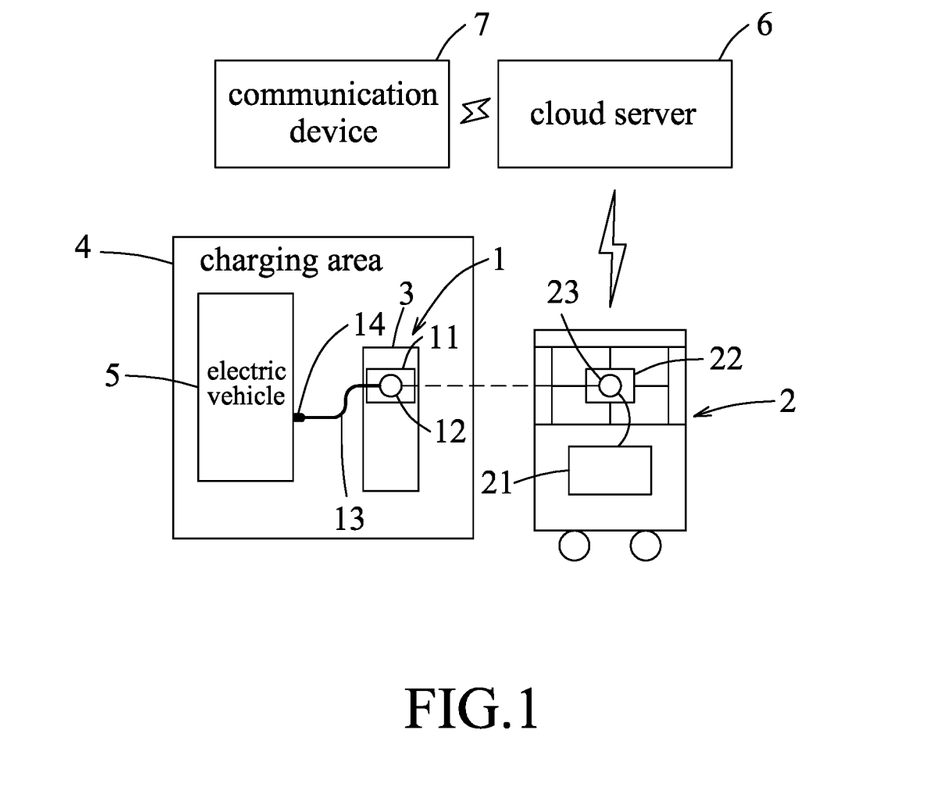
FIG. 1 is a schematic diagram illustrating a first embodiment of a charging system according to the disclosure.

Referring to FIG. 1, a first embodiment of a charging system for charging an electric vehicle 5 (e.g., an electric motorcycle or an electric car) according to the disclosure includes a charging device 1 and a mobile power supplying equipment 2.

The charging device 1 includes a charging base 11 that is adapted to be disposed on a support, a power receiving terminal 12 that is disposed on the charging base 11, an electric wire 13, and a charging gun 14 that is electrically connected to the power receiving terminal 12 through the electric wire 13 and that is configured to charge the electric vehicle 5 parked at a charging area 4. In this embodiment, the charging base 11 is disposed on a stand 3 that is disposed in the charging area 4 and that serves as the support, and the charging gun 14 is detachably disposed on the stand 3 (as shown by a dashed line in FIG. 1). The power receiving terminal 12 may be a socket or a connector that has a structure identical or similar to a structure of a charging inlet of the electric vehicle 5 (not shown), but is not limited thereto. The charging gun 14 is a connector that conforms to a standard which the charging inlet of the electric vehicle 5 adopts.

The mobile power supplying equipment 2 includes a power module 21 for supplying electric power, a docking device 22, and a power supplying terminal 23 that is disposed on the docking device 22 and that is electrically connected to the power module 21 for outputting the electric power. When the mobile power supplying equipment 2 moves to a position within a predetermined range of the charging base 11, the docking device 22 is configured to align the power supplying terminal 23 with the power receiving terminal 12 and control the power supplying terminal 23 to move toward the power receiving terminal 12 (for example, the docking device 22 drives the power supplying terminal 23 to move or extend toward the power receiving terminal 12) such that the power supplying terminal 23 is detachably docked with the power receiving terminal 12. When the power supplying terminal 23 is docked with the power receiving terminal 12, the mobile power supplying equipment 2 then controls the power module 21 to output the electric power to the charging gun 14 via the power supplying terminal 23 and the power receiving terminal 12 for the charging gun 14 charging the electric vehicle 5. The predetermined range is a range that the power supplying terminal 23 may extend from the mobile power supplying equipment 2 to dock with the power receiving terminal 12.

In this embodiment, the charging system further includes a cloud server 6 that communicates with the power supplying equipment 2 and a communication device 7. The communicate device 7 may be a smartphone, a tablet computer, a laptop computer, a personal computer, etc., held by a user who may be a driver of the electric vehicle 5. When the user goes to charge the electric vehicle 5 parked at the charging area 4, the user may first insert the charging gun 14 into the charging inlet of the electric vehicle 5, then may use the communication device 7 to send a charging request to the cloud server 6 through an application installed in the communication device 7 or through a webpage provided by the cloud server 6. When the cloud server 6 receives the charging request from the communication device 7, the cloud server 6 sends a signal indicating that the charging request is confirmed to the communication device 7.

For example, the charging request may include charging position information related to the charging base 11 that is associated with the charging area 4. In this embodiment, the charging base 11 associated with the charging area 4 is the charging base 11 disposed on the stand 3 which is disposed in the charging area 4. The charging position information may be in the form of a serial number, an identification code, a geographic coordinate set, etc. of the charging base 11 and may be input by the user into the application or the webpage mentioned above. When the communication device 7 is a smartphone with a camera module or a near-field communication (NFC) module, the user may use the communication device 7 to read a barcode (e.g., a one-dimensional barcode or a two-dimensional barcode) or a NFC tag disposed on the charging area 4 or the stand 3 in the charging area 4 so as to obtain the charging position information, and the communication device 7 may then automatically send the charging request including the charging position information to the cloud server 6.

For another example, the charging request may include charging area information related to the charging area 4 (e.g., a serial number, an identification code, a geographic coordinate set, etc. of the charging area 4). When the cloud server 6 receives the charging request including the charging area information, the cloud server 6 may obtain the charging position information related to the charging base 11 with reference to the charging area information according to a pre-stored table that has the association between the charging area 4 and the charging base 11.

The charging request may include user information related to the user (e.g., an identification code or an account number of the user). When the charging area 4 is a private parking space, the cloud server 6 may obtain the charging position information with reference to the charging request according a pre-stored table that has the association among the user, the charging area 4, and the charging base 11.

When the cloud server 6 manages a plurality of the mobile power supplying equipments 2, the cloud server 6 is configured to, after receiving the charging request from the communicate device 7, assign one of the mobile power supplying equipments 2 that is in a waiting area (not shown, i.e., the mobile power supplying equipment 2 is available and is on standby) nearest to the charging base 11 according to the charging position information to supply electric power to the electric vehicle 5 parked at the charging area 4 associated with the charging base 11, and send a charging instruction including the charging position information related to the charging base 11 to the one of the mobile power supplying equipments 2 to make the one of the mobile power supplying equipments 2 move to the position within the predetermined range of the charging base 11 according to the charging position information.

The mobile power supplying equipment 2 has a self-driving function and further includes a computer device (not shown), one or more sensors (e.g., camera, radar, lidar) that may be equipped with computer vision technologies such as machine vision, image processing and image recognition, and a self-driving system that includes an electronic map and that is configured to navigate the mobile power supplying equipment 2 to move around in surroundings of the mobile power supplying equipment 2 (including the charging base 11). The electronic map includes, for example, a position of the charging base 11, a position of the waiting area of the mobile power supplying equipment 2, and a predetermined route from the waiting area to the charging base 11. Using the lidar as an example, the computer device may use the lidar to scan the surroundings and then apply the computer vision technologies to obtain various features of the surroundings. Therefore, during movement, the mobile power supplying equipment 2 may obtain the surrounding features through the lidar and the computer device, and then may obtain a current position thereof on the electronic map by comparing the surrounding features and the electronic map. When the mobile power supplying equipment 2 determines that one or more of the surrounding features thus obtained is identical to a feature related to the charging base 11, the mobile power supplying equipment 2 then determines that it has arrived at the position within the predetermined range of the charging base 11. The self-driving technology is not the focus of the disclosure, and therefore details thereof are omitted for the sake of brevity.

Therefore, when the mobile power supplying equipment 2 receives the charging instruction, the self-driving system thereof may move the mobile power supplying equipment 2 to the position within the predetermined range of the charging base 11 according to the electronic map and the charging position information included in the charging instruction. Then, when the mobile power supplying equipment 2 arrives at the position within the predetermined range of the charging base 11, the docking device 22 may use the computer vision technologies to adjust the power supplying terminal 23 to make the power supplying terminal 23 dock with the power receiving terminal 12 of the charging device 1, and then the power module 21 to output power to the charging gun 14 via the power supplying terminal 23 and the power receiving terminal 12 for the charging gun 14 charging the electric vehicle 5.

In some embodiments, the mobile power supplying equipment 2 may include a self-driving vehicle and a power supplying vehicle that are two separate vehicles. The self-driving vehicle includes the computer device, the one or more sensors, and the self-driving system as mentioned in the above paragraph. The power supplying vehicle includes the power module 21, the docking device 22, and the power supplying terminal 23. The self-driving vehicle trails the power supplying vehicle and drives the power supplying vehicle to the position within the predetermined range of the charging base 11 according to the charging position information, and then the self-driving vehicle separates the power supplying vehicle from itself and leaves the power supplying vehicle for the power supplying vehicle supplying the electric power to the electric vehicle 5. Then, the self-driving vehicle may be ready to serve another power supplying vehicle or back to the waiting area. When the power supplying vehicle is moved to the position within the predetermined range of the charging base 11, the docking device 22 of the power supplying vehicle adjusts the power supplying terminal 23 to make the power supplying terminal 23 detachably dock with the power receiving terminal 12 disposed on the charging base 11 and the power module 23 of the power supplying vehicle outputs the power to the charging gun 14.

During outputting of the electric power to the charging gun 14, the mobile power supplying equipment 2 may be configured to obtain power information of the electric vehicle 5 via the charging gun 14 and send the power information to the cloud server 6, such that the communication device 7 may query the cloud server 6 about the power information through the application or the webpage mentioned above and show the power information on a screen of the communication device 7. The power information includes at least a charging status of the electric vehicle 5, a current power amount of the electric vehicle 5, an amount of power that has been charged to the electric vehicle 5, and other information related to the electric vehicle 5 (e.g., charging fee). After that, when the user wants to stop charging the electric vehicle 5, the user may also use the communication device 7 to send a charge termination request to the cloud server 6 through the application or the webpage, and the cloud server 6 then sends a charge termination instruction to the mobile power supplying equipment 2 to stop supplying the electric power to the electric vehicle 5.

Figure 2:
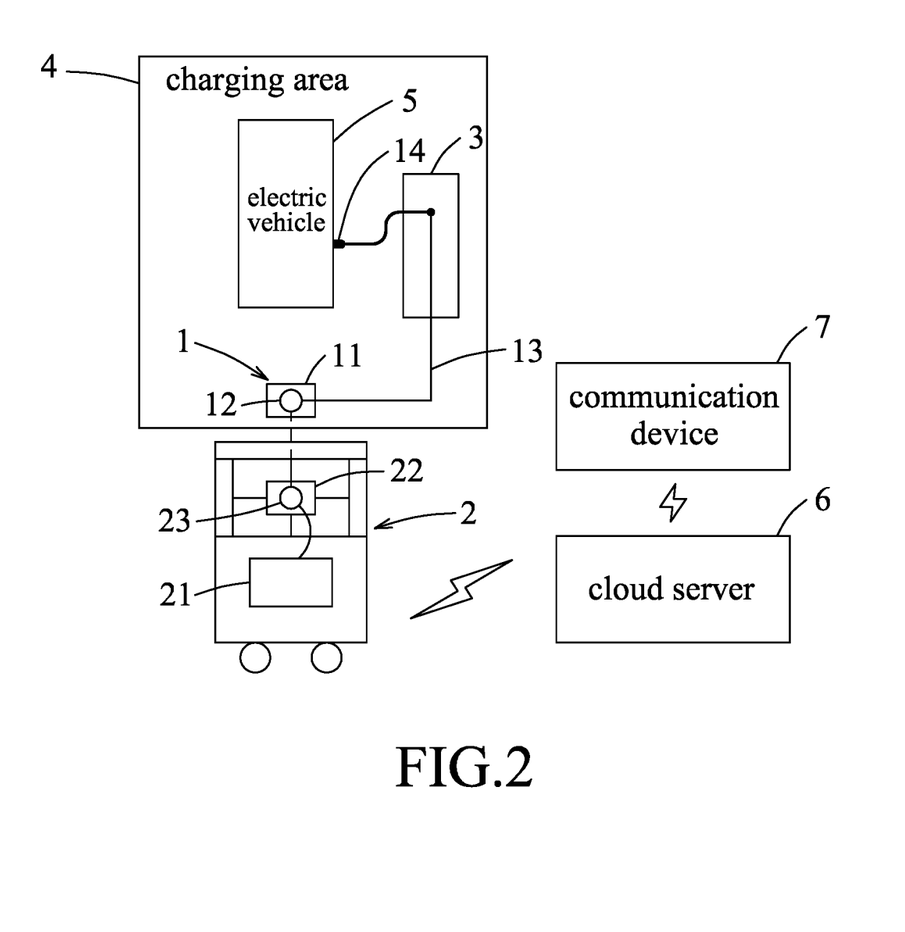
FIG. 2 is a schematic diagram illustrating a second embodiment of the charging system according to the disclosure.

Referring to FIG. 2, a second embodiment of the charging system according to the disclosure is illustrated. The second embodiment is similar to the first embodiment, and the following will only describe differences between the first and second embodiments for the sake of brevity. The charging area 4 has a floor that serves as the support. That is to say, in this embodiment, the charging base 11 of the second embodiment is disposed on the floor of the charging area 4. In addition, the charging device 1 further includes the stand 3 that is adapted to be disposed on the floor of the charging area 4, the charging gun 14 is detachably disposed on the stand 3, and the electric wire 13 extends from the power receiving terminal 12 to the stand 3 to electrically connect the charging gun 14.

More specifically, the charging base 11 may be disposed on the floor in a recessed manner (i.e., the power receiving terminal 12 does not protrude from the floor and the electric wire 13 extends under the floor). In some embodiments, the charging base 11 may be disposed on the floor in a flat manner (i.e., the power receiving terminal 12 is coplanar with the floor and the electric wire 13 is distributed and lies flat on the floor).

Therefore, when the mobile power supplying equipment 2 moves to the position within the predetermined range of the charging base 11 associated with the charging area 4 (in this embodiment, the mobile power supplying equipment 2 moves to a position above the charging base 11 in the charging area 4), the docking device 22 then adjusts the power supplying terminal 23 to face downwardly and aligns the power supplying terminal 23 with the power receiving terminal 12 and controls the power supplying terminal 23 to move toward the power receiving terminal 12 such that the power supplying terminal 23 is detachably docked with the power receiving terminal 12.

Figure 3:
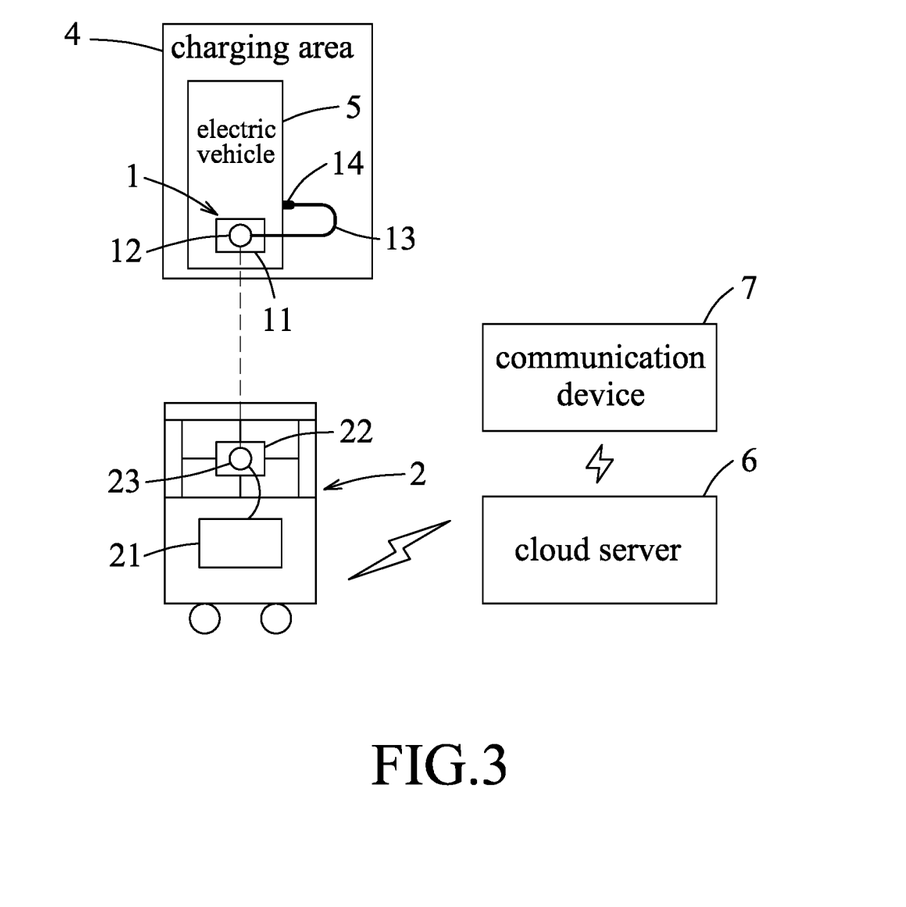
FIG. 3 is a schematic diagram illustrating a third embodiment of the charging system according to the disclosure.

Referring to FIG. 3, a third embodiment of the charging system according to the disclosure is illustrated. The third embodiment is similar to the first embodiment, the following will only describe differences between the first and third embodiments for the sake of brevity. In this embodiment, the charging device 1 may be held by the user or placed at a corner of the charging area 4. When the user goes to charge the electric vehicle 5 parked at the charging area 4, the user has to put the charging base 11 on a vehicle body of the electric vehicle 5 (for example, but not limited to, a front portion or a rear portion of the electric vehicle 5) and make the power receiving terminal 12 face outwardly, such that the charging base 11 is detachably disposed on the vehicle body of the electric vehicle 5 (i.e., the electric vehicle 5 serves as the support) and the power supplying terminal 23 may dock with the power receiving terminal 12. Then, the user inserts the charging gun 14 into the inlet of the electric vehicle 5 and operates the communication device 7 to send the charging request to the cloud server 6. For example, the charging base 11 may be attached to the vehicle body of the electric vehicle 5 by a sucking disc or a magnet.

Figure 4:
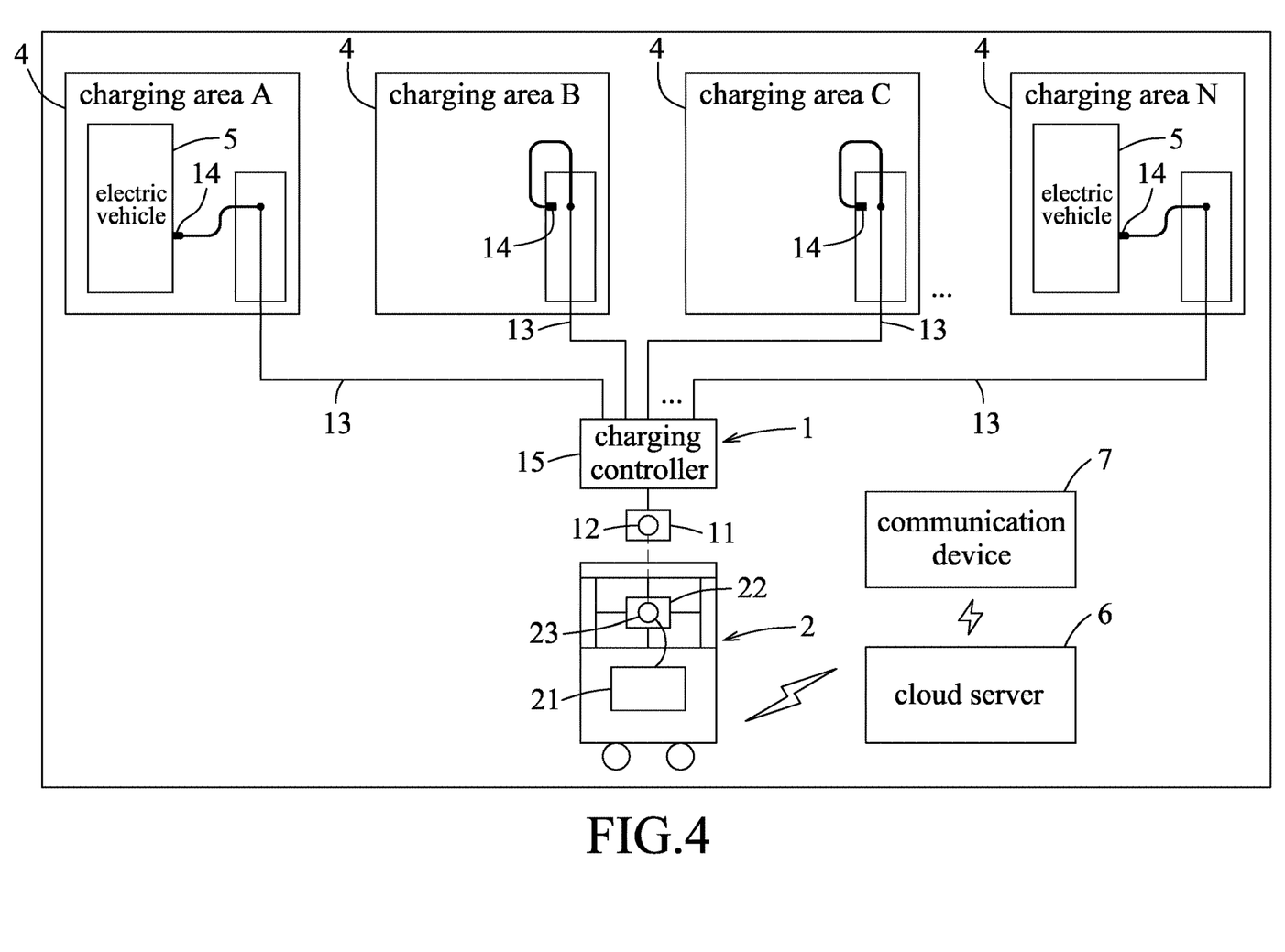
FIG. 4 is a schematic diagram illustrating a fourth embodiment of the charging system according to the disclosure.

Referring to FIG. 4, a fourth embodiment of the charging system according to the disclosure is illustrated. The fourth embodiment is similar to the second embodiment, the following will only describe differences between the second and fourth embodiments for the sake of brevity. In this embodiment, the charging device 1 further includes a charging controller 15 that is electrically connected to the power receiving terminal 12, a plurality of the electric wires 13 that are electrically connected to the charging controller 15, and a plurality of the charging guns 14 that are electrically connected to the charging controller 15 respectively through the electric wires 13 and that are adapted to be disposed respectively in a plurality of the charging areas 4 (e.g., charging area A, charging area B, charging area C, . . . , charging area N). Each of the electric wires 13 extends from the charging controller 15 to the corresponding one of the charging areas 4 to electrically connect the corresponding one of the charging guns 14. In other words, the power receiving terminal 12 disposed on the charging base 11 is electrically connected to the charging guns 14 disposed respectively in the charging area 4 through the charging controller 15 and the electric wires 13. When the power supplying terminal 23 is docked with the power receiving terminal 12, the mobile power supplying equipment 2 electrically connects to the charging controller 15 through the power supplying terminal 23 and the power receiving terminal 12. Furthermore, the mobile power supplying equipment 2 is configured to communicate with the charging controller 15 and send the control instruction to the charging controller 15 such that the charging controller 15, according to the control instruction, transmits the electric power from the power receiving terminal 12 to one of the charging guns 14 corresponding to one of the charging areas 4 indicated by the control instruction through the corresponding one of the electric wires 13. The mobile power supplying equipment 2 communicates with the charging controller 15 through the power receiving terminal 12 or through built-in short-range wireless communication modules, such as Bluetooth® modules, respectively included in the mobile power supplying equipment 2 and the charging controller 15. The charging controller 15 may be embodied using a single-chip microcomputer (MCU). In this embodiment, the charging base 11 and the charging controller 15 may be disposed on the support, such as a stand, a floor, a concrete pole, a pillar or a wall of a building, etc.

For example, when the user goes to charge the electric vehicle 5 parked at the charging area A, the user has to insert the charging gun 14 disposed in the charging area A into the charging inlet of the electric vehicle 5 and send the charging request to the cloud server 6 through the communication device 7. In this embodiment, the charging request includes the charging area information related to the charging area A or the user information related to the user. In one embodiment, when the charging area A is a private parking space, the charging request then includes one or both of the charging area information and the user information. In one embodiment, when the charging area A is a public parking space, the charging request may then only include the charging area information. In some cases, the charging request may further include the charging position information related to the charging base 11 electrically connected to the charging gun 14 disposed in the charging area A. When the cloud server 6 receives the charging request from the communication device 7, the cloud server 6 then sends the charging instruction to the mobile power supplying equipment 2 which is assigned according to the charging request. The charging instruction includes the charging position information and the charging area information. When the mobile power supplying equipment 2 receives the charging instruction from the cloud server 6, the mobile power supplying equipment 2 moves to the position within the predetermined range of the charging base 11 associated with the charging area A according to the charging instruction and docks with the power receiving terminal 12, and the mobile power supplying equipment 2 then sends the charging instruction to the charging device 1 and outputs the electric power to the charging device 1 through the power receiving terminal 12. The charging controller 15 of the charging device 1 transmits the electric power to the charging gun 14 disposed in the charging area A according to the charging instruction for the charging gun 14 charging the electric vehicle 5 that is parked at the charging area A.

When the mobile power supplying equipment 2 outputs the electric power to the charging gun 14 for the charging gun 14 charging the electric vehicle 5, the mobile power supplying equipment 2 also obtains the power information of the electric vehicle 5 via the charging gun 14 and the charging controller 15 and sends the power information to the cloud server 6, such that the user may use the communication device 7 to query the cloud server 6 about the power information.

Figure 5:
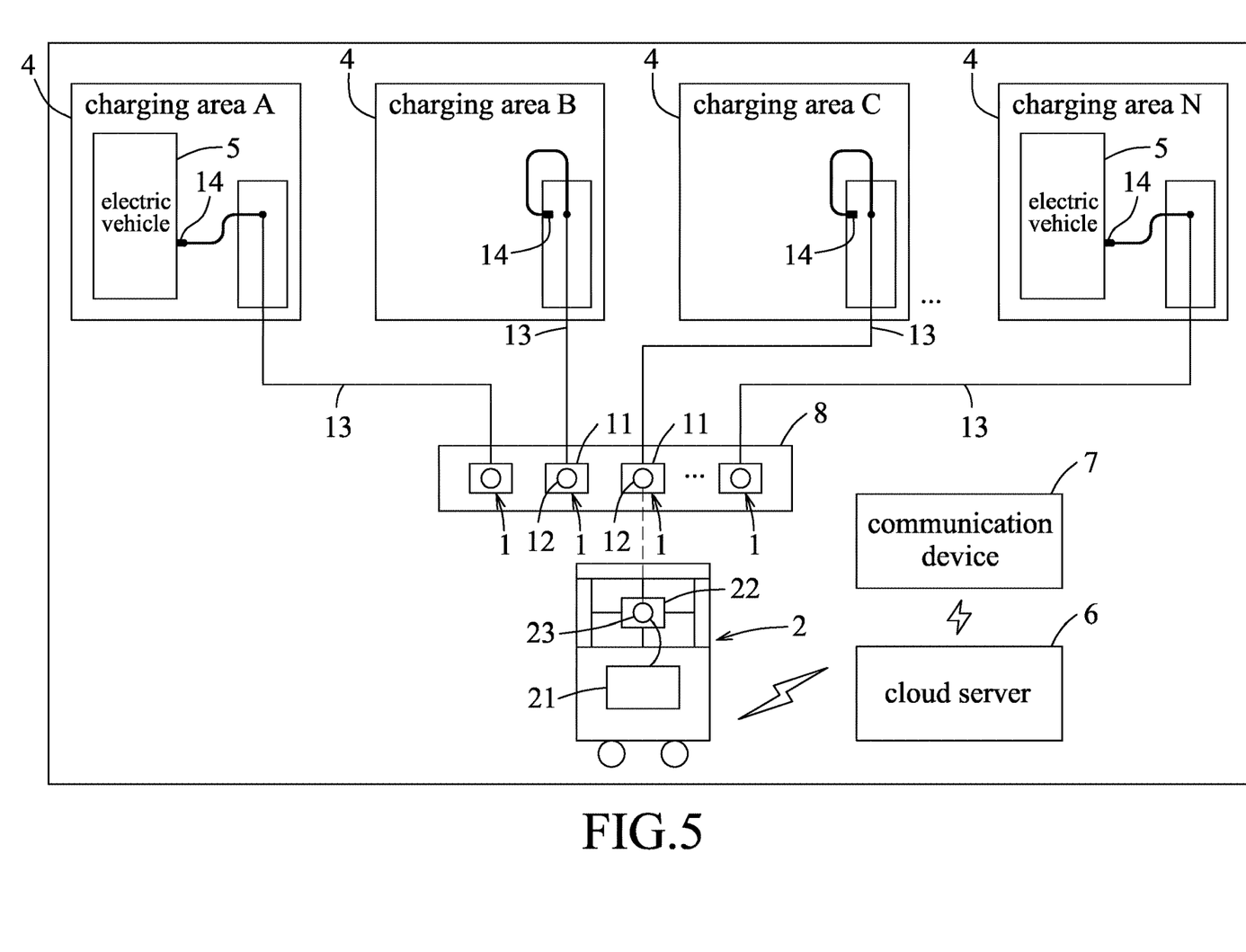
FIG. 5 is a schematic diagram illustrating a fifth embodiment of the charging system according to the disclosure.

Referring to FIG. 5, a fifth embodiment of the charging system is illustrated. In this embodiment, the charging system includes a plurality of the charging devices 1, the charging bases 11 respectively of the charging devices 1 are adapted to be disposed on a pole 8 which serves as the support, and the charging guns 14 respectively of the charging devices 1 are adapted to be disposed respectively in a plurality of the charging areas 4. For each of the charging devices 1, the electric wire 13 thereof extends from the power receiving terminal 12 thereof to a respective one the charging areas 4 and is electrically connected to the charging gun 14 thereof. In this embodiment, the charging position information may include information related to a position of the pole 8 and information related to the charging base 11 (e.g., number, code, etc.). When receiving the charging instruction including the charging position information, the mobile power supplying equipment 2 moves to the position of the pole 8 and finds the charging base 11 indicated by the charging position information (for example, by using the computer vision technologies) and docks with the charging base 11.

Generally, the electric vehicle 5 may be charged with alternating-current (AC) power (i.e., the mobile power supplying equipment 2 outputting the electric power in the form of AC power) in an AC charging mode, or be charged with direct-current (DC) power (i.e., the mobile power supplying equipment 2 outputting the electric power in the form of DC power) in a DC charging mode (which is known as fast charging mode). It should be noted that the above embodiments are for a case where the electric vehicle 5 is charged with the AC power. Because electric current of the AC power is relatively low, the mobile power supplying equipment 2 is not required to output the electric power (the AC power) to the electric vehicle 5 in a predetermined time after the charging gun 14 is inserted in the charging inlet of the electric vehicle 5. Therefore, it is relatively safe for the electric vehicle 5 to wait for the mobile power supplying equipment 2 for providing the electric power after the charging gun 14 is inserted in the charging inlet.

On the other hand, since electric current of the DC power is relatively high, the electric vehicle 5 will execute a time limitation mechanism for safety reasons when the electric vehicle 5 is in the DC charging mode. For example, if the electric vehicle 5 does not receive the electric power (the DC power) in the predetermined time (e.g., 40 seconds) after the charging gun 14 is inserted in to the charging inlet of the electric vehicle 5, the electric vehicle 5 then rejects to receive electric power for charging.

Figure 6:
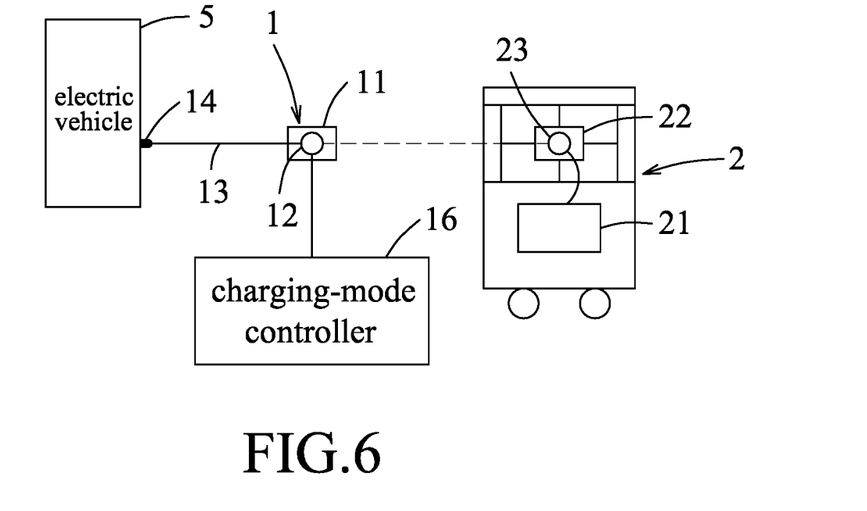
FIG. 6 is a fragmentary schematic diagram illustrating a charging system according to an embodiment of the disclosure.

Referring to FIG. 6, a charging system according to an embodiment of this disclosure is illustrated. For the above-mentioned situation where the electric vehicle 5 rejects to receive the electric power from the mobile power supplying equipment 2 when the electric vehicle 5 is in the DC charging mode and the mobile power supplying equipment 2 does not supply the DC power in the predetermined time, the charging system of this embodiment further includes a charging-mode controller 16 that is electrically connected to the power receiving terminal 12. The charging-mode controller 16 is configured to, when the charging-mode controller 16 determines that the electric vehicle 5 is in the DC charging mode according to a signal received from the electric vehicle 5 through the charging gun 14 and that the power receiving terminal 12 of the charging device 1 does not receive the electric power from the mobile power supplying equipment 2, continuously send a first control signal to the electric vehicle 5 through the charging gun 14 to make the electric vehicle 5 change to the AC charging mode until the charging-mode controller 16 determines that the power receiving terminal 12 of the charging device 1 receives the electric power from the mobile power supplying equipment 2, which means that the power supplying terminal 23 of the mobile power supplying equipment 2 is docked with the power receiving terminal 12 of the charging device 1 and the mobile power supplying equipment 2 is ready for outputting the electric power. In response to receipt of the first control signal, the electric vehicle 5 then changes to the AC charging mode and stops executing the time limitation mechanism, such that the electric vehicle 5 is ready for charging and does not have to be charged within the predetermined time. When the charging-mode controller 16 determines that the power receiving terminal 12 of the charging device 1 receives the electric power from the mobile power supplying equipment 2, the charging-mode controller 16 then stops sending the first control signal to the electric vehicle 5, sends a first notification signal to the mobile power supplying equipment 2 for notifying the mobile power supplying equipment 2 to stop outputting the electric power, sends a second control signal to the electric vehicle 5 to make the electric vehicle 5 be in the DC charging mode, and sends a second notification signal to the mobile power supplying equipment 2 for notifying the mobile power supplying equipment 2 to output the electric power in the form of the DC power after sending the second control signal to the electric vehicle 5. The charging-mode controller 16 may be embodied using a MCU.

Figure 7:
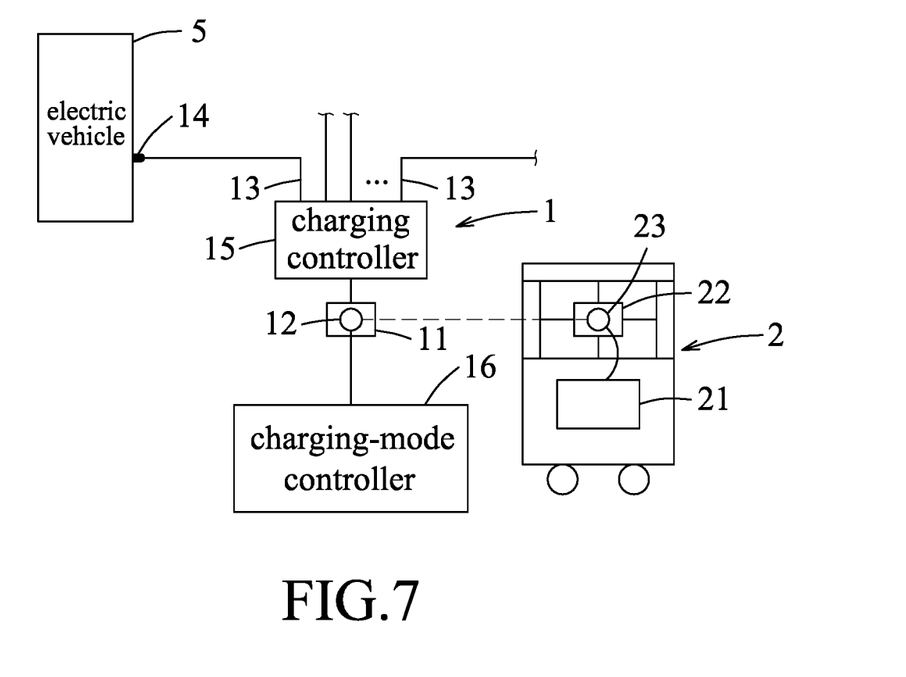
FIG. 7 is a schematic diagram illustrating a part of a charging system according to an embodiment of the disclosure.

Referring to FIG. 7, a charging system according to an embodiment of this disclosure is illustrated. Similarly, in this embodiment, the charging system further includes the charging-mode controller 16 that is electrically connected to the power supplying receiving terminal 12. The difference between the charging-mode controllers 16 of the embodiments illustrated respectively in the FIG. 6 and FIG. 7 is that the charging-mode controller 16 of the embodiment illustrated in FIG. 7 receives a signal from the electric vehicle 5 through the charging gun 14 and the charging controller 15 and sends the first and second control signals to the electric vehicle 5 through the charging controller 15 and the charging gun 14.

In sum, the mobile power supplying equipment 2 charges the electric vehicle 5 through the charging device 1 without direct contact with the electric vehicle 5, such that the charging inlet and the vehicle body of the electric vehicle 5 may not be scratched or damaged by the mobile power supplying equipment 2. Because the mobile power supplying equipment 2 may move by itself, multiple electric vehicles may be charged in turns by the mobile power supplying equipment 2, and the user does not have to wait at the charging area 4 and move the electric vehicle 5 immediately after the electric vehicle 5 is fully charged. Furthermore, the user may leave the charging area 4 and then send the charging request by using the communication device 7 after he/she inserts the charging gun 14 into the charging inlet of the electric vehicle 5. The user does not have to wait at the charging area 4 until the mobile power supplying equipment 2 moves to the charging area 4 to supply electric power to the electric vehicle 5 and may check the charging status of the electric vehicle 5 through the communication device 7. Therefore, the purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A charging system for charging an electric vehicle, comprising:
　　a charging device including a charging base that is adapted to be disposed on a support, a power receiving terminal that is disposed on said charging base, and a charging gun that is electrically connected to said power receiving terminal and that is configured to charge the electric vehicle parked at a charging area; and
　　a mobile power supplying equipment including a power module, a docking device, and a power supplying terminal that is disposed on said docking device and that is electrically connected to said power module;
　　wherein, when said mobile power supplying equipment moves to a position within a predetermined range of said charging base, said docking device is configured to align said power supplying terminal with said power receiving terminal and control said power supplying terminal to move toward said power receiving terminal such that said power supplying terminal is detachably docked with said power receiving terminal, and then said power module outputs electric power to said charging gun via said power supplying terminal and said power receiving terminal for said charging gun to charge the electric vehicle,
　　wherein said charging device further includes a charging-mode controller that is electrically connected to said power receiving terminal, and that is configured to
　　　when said charging-mode controller determines that the electric vehicle is in a direct-current (DC) charging mode according to a signal received from the electric vehicle through said charging gun and determines that said power receiving terminal of said charging device does not receive the electric power from said mobile power supplying equipment, continuously send a first control signal to the electric vehicle through said charging gun to make the electric vehicle change to an alternating-current (AC) charging mode and ready for charging until said charging-mode controller determines that said power receiving terminal of said charging device receives the electric power from said mobile power supplying equipment; and when said charging-mode controller determines that said power receiving terminal of said charging device receives the electric power from said mobile power supplying equipment,
stop sending the first control signal to the electric vehicle,
send a first notification signal to said mobile power supplying equipment for notifying said mobile power supplying equipment to stop outputting the electric power, send a second control signal to the electric vehicle to make the electric vehicle be in the DC charging mode, and
send a second notification signal to said mobile power supplying equipment for notifying said mobile power supplying equipment to output the electric power in a DC form after sending the second control signal to the electric vehicle.

2. The charging system as claimed in claim 1, the support being a stand that is disposed in the charging area,
wherein said charging gun is adapted to be detachably disposed on the stand.

3. The charging system as claimed in claim 1, the charging area having a floor that serves as the support,
wherein said charging device further includes a stand that is adapted to be disposed on the floor of the charging area, and an electric wire that extends from said power receiving terminal to said stand to electrically connect said charging gun, and said charging gun is detachably disposed on said stand.

4. The charging system as claimed in claim 1, the support being the electric vehicle parked at the charging area, wherein said charging base is detachably disposed on the electric vehicle.

5. The charging system as claimed in claim 1, comprising a plurality of said charging devices, wherein said charging bases respectively of said charging devices are adapted to be disposed on a pole which serves as the support, and said charging guns respectively of said charging devices are adapted to be disposed respectively in a plurality of the charging areas,
wherein each of said charging devices further includes an electric wire that extends from said power receiving terminal thereof to a respective one of the charging areas and that is electrically connected to said charging gun thereof.

6. The charging system as claimed in claim 1, further comprising a cloud server that is configured to:
communicate with said mobile power supplying equipment and a communication device; and
when said cloud server receives a charging request from the communication device, assign said mobile power supplying equipment to supply power to the electric vehicle parked at the charging area according to the charging request, and send a charging instruction that includes charging position information related to said charging base that is associated with the charging area to said mobile power supplying equipment to make said mobile power supplying equipment move to the position within the predetermined range of said charging base according to the charging position information, said cloud server being configured to obtain the charging position information in one of a manner of obtaining the same directly from the charging request and a manner of obtaining the same with reference to the charging request.

7. The charging system as claimed in claim 6, wherein, during supplying power to the electric vehicle, said mobile power supplying equipment is configured to obtain power information of the electric vehicle via said charging gun and send the power information to said cloud server, such that the communication device is capable of querying said cloud server about the power information, the power information including charging status of the electric vehicle, a current power amount of the electric vehicle, and an amount of power that has been charged to the electric vehicle.

8. A charging system for charging an electric vehicle, comprising:
a charging device including a charging base that is adapted to be disposed on a support, a power receiving terminal that is disposed on said charging base, and a charging gun that is electrically connected to said power receiving terminal and that is configured to charge the electric vehicle parked at a charging area; and
a mobile power supplying equipment including a power module, a docking device, and a power supplying terminal that is disposed on said docking device and that is electrically connected to said power module,
wherein, when said mobile power supplying equipment moves to a position within a predetermined range of said charging base, said docking device is configured to align said power supplying terminal with said power receiving terminal and control said power supplying terminal to move toward said power receiving terminal such that said power supplying terminal is detachably docked with said power receiving terminal, and then said power module outputs electric power to said charging gun via said power supplying terminal and said power receiving terminal for said charging gun to charge the electric vehicle,
wherein said charging device further includes a charging controller that is electrically connected to said power receiving terminal, a plurality of electric wires that are electrically connected to said charging controller, and a plurality of said charging guns that are electrically connected to said charging controller respectively through said electric wires and that are adapted to be disposed respectively in a plurality of the charging areas,
wherein each of said electric wires extends from said charging controller to the corresponding one of the charging areas to electrically connect the corresponding one of said charging guns,
wherein said mobile power supplying equipment is configured to communicate with said charging controller and send a control instruction to said charging controller such that said charging controller, according to the control instruction, transmits power from said power receiving terminal to one of said charging guns corresponding to one of the charging areas indicated by the control instruction.

9. The charging system as claimed in claim 8, wherein said charging device further includes a charging-mode controller that is electrically connected to said power receiving terminal, and that is configured to:
when said charging-mode controller determines that the electric vehicle is in a DC charging mode according to a signal received from the electric vehicle through said charging gun and said charging controller and determines that said power receiving terminal of said charging device does not receive the electric power from said mobile power supplying equipment, continuously send a first control signal to the electric vehicle through said charging controller and said charging gun to make the electric vehicle change to an AC charging mode and ready for charging until said charging-mode controller determines that said power receiving terminal of said charging device receives the electric power from said mobile power supplying equipment; and when said charging-mode controller determines that said power receiving terminal of said charging device receives the electric power from said mobile power supplying equipment,
stop sending the first control signal to the electric vehicle,
send a first notification signal to said mobile power supplying equipment for notifying said mobile power supplying equipment to stop outputting the electric power,
send a second control signal to the electric vehicle to make the electric vehicle be in the DC charging mode, and
send a second notification signal to said mobile power supplying equipment for notifying said mobile power supplying equipment to output the electric power in a DC form after sending the second control signal to the electric vehicle.

10. The charging system as claimed in claim 8, further comprising a cloud server that is configured to:
communicate with said mobile power supplying equipment and a communication device; and
when said cloud server receives a charging request from the communication device, assign said mobile power supplying equipment to supply power to the electric vehicle parked at the charging area according to the charging request, send a charging instruction that includes charging position information related to said charging base that is associated with the charging area to said mobile power supplying equipment to make said mobile power supplying equipment move to the position within the predetermined range of said charging base according to the charging position information, and generate the control instruction according to the charging position information and send the control instruction to the charging controller, said cloud server being configured to obtain the charging position information in one of a manner of obtaining the same directly from the charging request and a manner of obtaining the same with reference to the charging request.

11. The charging system as claimed in claim 10, wherein, during supplying power to the electric vehicle, said mobile power supplying equipment is configured to obtain power information of the electric vehicle via said charging gun and send the power information to said cloud server such that the communication device is capable of querying said cloud server about the power information, the power information including charging status of the electric vehicle, a current power amount of the electric vehicle, and an amount of power that has been charged to the electric vehicle.

12. A charging device configured to electrically connect an electric vehicle and a mobile power supplying equipment, the mobile power supplying equipment including a power module for supplying electric power, and a power supplying terminal electrically connected to said power module for outputting the electric power, said charging device comprising:
a charging base;
a power receiving terminal that is disposed on said charging base and that is configured to detachably dock with the power supplying terminal of the mobile power supplying equipment to receive the electric power from the mobile power supplying equipment;
a charging gun that is electrically connected to said power receiving terminal and that is configured to charge the electric vehicle using the electric power from the mobile power supplying equipment; and
a charging-mode controller that is electrically connected to said power receiving terminal, and that is configured to
when said charging-mode controller determines that the electric vehicle is in a direct-current (DC) charging mode according to a signal received from the electric vehicle through said charging gun and determines that said power receiving terminal of said charging device does not receive the electric power from the mobile power supplying equipment, continuously send a first control signal to the electric vehicle through said charging gun to make the electric vehicle change to an alternating-current (AC) charging mode and ready for charging until said charging-mode controller determines that said power receiving terminal of said charging device receives the electric power from the mobile power supplying equipment, and
when said charging-mode controller determines that said power receiving terminal of said charging device receives the electric power from said mobile power supplying equipment,
stop sending the first control signal to the electric vehicle,
send a first notification signal to said mobile power supplying equipment for notifying said mobile power supplying equipment to stop outputting the electric power,
send a second control signal to the electric vehicle to make the electric vehicle be in the DC charging mode, and
send a second notification signal to said mobile power supplying equipment for notifying said mobile power supplying equipment to output the electric power in a DC form after sending the second control signal to the electric vehicle.

13. The charging device as claimed in claim 12, the electric vehicle being parked at a charging area, a stand being disposed in the charging area,
wherein said charging base is adapted to be disposed on the stand, and said charging gun is adapted to be detachably disposed on the stand.

14. The charging device as claimed in claim 12, the electric vehicle being parked at a charging area, the charging area having a floor, a stand being disposed in the charging area, the charging device further comprising an electric wire,
wherein said charging base is adapted to be disposed on the floor of the charging area, and said electric wire is adapted to extend from said power receiving terminal to the stand to electrically connect said charging gun, and said charging gun is adapted to be detachably disposed on the stand.

15. The charging device as claimed in claim 12, wherein said charging base is adapted to be detachably disposed on the electric vehicle.

16. A charging device configured to electrically connect an electric vehicle and a mobile power supplying equipment, the mobile power supplying equipment including a power module for supplying electric power, and a power supplying terminal electrically connected to said power module for outputting the electric power, said charging device comprising:
- a charging base;
- a power receiving terminal that is disposed on said charging base and that is configured to detachably dock with the power supplying terminal of the mobile power supplying equipment to receive the electric power from the mobile power supplying equipment;
- a charging gun that is electrically connected to said power receiving terminal and that is configured to charge the electric vehicle using the electric power from the mobile power supplying equipment; and
- a charging controller that is electrically connected to said power receiving terminal, a plurality of electric wires that are electrically connected to said charging controller, and a plurality of said charging guns that are electrically connected to said charging controller respectively through said electric wires and that are adapted to be disposed respectively in a plurality of the charging areas,
- wherein each of said electric wires extends from said charging controller to the corresponding one of the charging areas to electrically connect the corresponding one of said charging guns,
- wherein said charging controller is configured to communicate with the mobile power supplying equipment and receive a control instruction from the mobile power supplying equipment, and, according to the control instruction, transmit power from said power receiving terminal to one of said charging guns corresponding to one of the charging area indicated by the control instruction.

17. The charging device as claimed in claim 16, further comprising a charging-mode controller that is electrically connected to said power receiving terminal, and that is configured to:
- when said charging-mode controller determines that the electric vehicle is in a DC charging mode according to a signal received from the electric vehicle through said charging gun and determines that said power receiving terminal of said charging device does not receive the electric power from the mobile power supplying equipment, continuously send a first control signal to the electric vehicle through said charging gun to make the electric vehicle change to an AC charging mode and ready for charging until said charging-mode controller determines that said power receiving terminal of said charging device receives the electric power from the mobile power supplying equipment; and
- when said charging-mode controller determines that said power receiving terminal of said charging device receives the electric power from said mobile power supplying equipment,
  - stop sending the first control signal to the electric vehicle,
  - send a first notification signal to said mobile power supplying equipment for notifying said mobile power supplying equipment to stop outputting the electric power,
  - send a second control signal to the electric vehicle to make the electric vehicle be in the DC charging mode, and
  - send a second notification signal to said mobile power supplying equipment for notifying said mobile power supplying equipment to output the electric power in a DC form after sending the second control signal to the electric vehicle.

18. The charging device as claimed in claim 16, the electric vehicle being parked at a charging area, a stand being disposed in the charging area,
- wherein said charging base is adapted to be disposed on the stand, and said charging gun is adapted to be detachably disposed on the stand.

19. The charging device as claimed in claim 16, the electric vehicle being parked at a charging area, the charging area having a floor, a stand being disposed in the charging area, the charging device further comprising an electric wire,
- wherein said charging base is adapted to be disposed on the floor of the charging area, and said electric wire is adapted to extend from said power receiving terminal to the stand to electrically connect said charging gun, and said charging gun is adapted to be detachably disposed on the stand.

20. The charging device as claimed in claim 16, wherein said charging base is adapted to be detachably disposed on the electric vehicle.

* * * * *